United States Patent [19]
Senapati

[11] Patent Number: 5,542,548
[45] Date of Patent: Aug. 6, 1996

[54] FINE MESH SCREENING

[75] Inventor: Nagabhusan Senapati, Worthington, Ohio

[73] Assignee: Sweco, Incorporated, Florence, Ky.

[21] Appl. No.: 407,587

[22] Filed: Mar. 20, 1995

Related U.S. Application Data

[63] Continuation of Ser. No. 94,850, Jul. 20, 1993, Pat. No. 5,398,816.

[51] Int. Cl.$^6$ ...................................... B07B 1/42
[52] U.S. Cl. .................... 209/365.1; 209/365.4; 310/328
[58] Field of Search ...................... 209/315, 325, 209/326, 364, 365.1, 365.4, 366.5, 395, 403, 405, 408, 412; 310/328; 366/127

[56] References Cited

U.S. PATENT DOCUMENTS

| | | | |
|---|---|---|---|
| 2,880,871 | 4/1959 | Bruninghaus | 209/310 |
| 3,049,235 | 8/1962 | Newburg | 209/346 |
| 3,490,584 | 1/1970 | Balamuth | 209/1 |
| 3,954,604 | 5/1976 | Krause et al. | 209/365.4 |
| 4,062,768 | 12/1977 | Elliott | 209/341 |
| 4,274,953 | 6/1981 | Jackson | 209/326 |
| 4,482,455 | 11/1984 | Humphrey | 209/366.5 X |
| 4,728,422 | 3/1988 | Bailey | 209/403 X |
| 4,816,144 | 3/1989 | Monteith | 209/364 |
| 5,143,222 | 9/1992 | Monteith | 209/364 |
| 5,221,008 | 6/1993 | Derrick, Jr. et al. | 209/403 X |
| 5,265,730 | 11/1993 | Norris et al. | 209/326 |
| 5,386,169 | 1/1995 | Dubruque | 310/323 |
| 5,398,816 | 3/1995 | Senapati | 209/364 |

FOREIGN PATENT DOCUMENTS

| | | | |
|---|---|---|---|
| 2682050 | 4/1993 | France. | |
| 1094218 | 12/1967 | United Kingdom. | |
| 1425924 | 1/1976 | United Kingdom | 209/326 |
| 1462866 | 1/1977 | United Kingdom. | |
| WO94/27748 | 12/1994 | WIPO. | |

OTHER PUBLICATIONS

Brochure of Sodeva, Published Mar. 1993 (2 pgs.).
Brochure of Sodeva, Assistance Ultrasonique Au Tamisage, Published Mar. 1993.

*Primary Examiner*—William E. Terrell
*Assistant Examiner*—Tuan Nguyen
*Attorney, Agent, or Firm*—Lyon & Lyon

[57] ABSTRACT

A screening system having a resiliently mounted frame with a screen extending thereacross. The frame is vibrated by a low frequency vibratory drive using eccentric weights. About the peripheral frame of the screen, a high frequency drive or drives is employed to vibrate the screen in the range of 20,000 Hz. The high frequency vibration is generated at the peripheral frame about the screen. The screen is responsive to the high frequency vibrations in a plate-like manner rather than as a membrane.

1 Claim, 2 Drawing Sheets

FINE MESH SCREENING

This application is a continuation of application Ser. No. 08/094,850 filed Jul. 20, 1993, issued Mar. 21, 1995 as U.S. Pat. No. 5,398,816.

BACKGROUND OF THE INVENTION

The field of the present invention is fine mesh screening systems including the use of high frequency vibration.

Traditional vibratory screening structures typically include a base, a frame resiliently mounted on the base with a screen or screens extending across the frame. A low frequency vibratory drive in the speed range of 8 Hz to 30 Hz is mounted to the frame with eccentric weights. Specific vibratory motions are established in the frame by the low frequency vibratory drive, generating screen accelerations up to the 7 g range.

The foregoing devices have been used for screening fine materials and powders. Stainless steel woven mesh screens having interstices in the 30 to 150 micron range are used for such commercial processing. These delicate, woven meshes are typically thin and comparatively limp. The mesh is usually stretched tightly and attached to a screen frame. The vibration of such devices typically enhances gravity separation of particles presented to the screen. Where fine particles are to be screened, the vibration also has a deleterious effect in that the fine particles become suspended above a boundary layer over the vibrating screen.

Fine mesh screens can be reasonably fragile under many if not most applications. Backing screens and perforated plates have been used to help support such screens. Such supported screens may be bonded or unbonded. One type of area bonding is diffusion bonding. In some instances, a fine screen cloth, a coarse screen cloth and a perforated plate have been used. The separate layers are bonded by heat and pressure into a unitary structure. A frame is typically used about the periphery of the composite screen structure for support, mounting and screen tension.

In an effort to overcome the deficiency of low frequency vibration, high frequency vibration has been employed. Ultrasonic vibrators have been mounted to separator frames with a direct mechanical attachment to the screens at the centers thereof. Alternatively, ultrasonic drives have been bonded directly to the screen. Fine mesh, tensioned screens tend to suffer fatigue failure at the boundary layer with the mechanical coupling to the ultrasonic drive and to dissipate energy within a few inches of that coupling. Such devices also use low frequency vibratory drives, principally as a means for conveying material across the screen or screens.

SUMMARY OF THE INVENTION

The present invention is directed to screening systems using screens stiff as to bending with a high frequency drive mounted to drive through a frame structure rather than through the screen cloth directly. Substantial energy can be transmitted across a wide area of screen cloth while fatigue failure of the screen at the boundary with the ultrasonic attachment is eliminated.

In a first, separate aspect of the present invention, a screen stiffened to have predominantly plate-like properties as measured at 20,000 Hz is employed for high frequency screening. Plate-like properties include motion behavior influenced more by bending than by tension. Long wavelength high frequency motion is promoted by such screen stiffness. High damping of short wavelength energy transmitted in thin screens acting as tension membranes is significantly reduced. Thus, substantial high frequency energy distribution can be effected through the employment of a stiff screen.

In a second, separate aspect of the present invention, a high frequency drive or drives of a vibratory screening system having a resiliently mounted frame are provided at a frame about the screen, either through the resiliently mounted frame of the screening device or through a rigid screen frame. Direct attachment of the high frequency drive to the screen with attendant fatigue failure is avoided.

In yet a further, separate aspect of the present invention, high frequency vibration is provided to a screen frame, either directly or through a resiliently mounted separator frame of a vibratory screening system, with a stiff screen which behaves plate-like at high frequencies.

Thus, improved fine particle screening is achieved. Other objects and advantages will appear hereinafter.

DETAILED DESCRIPTION OF THE PREFERRED EMBODIMENTS

Figure 1:
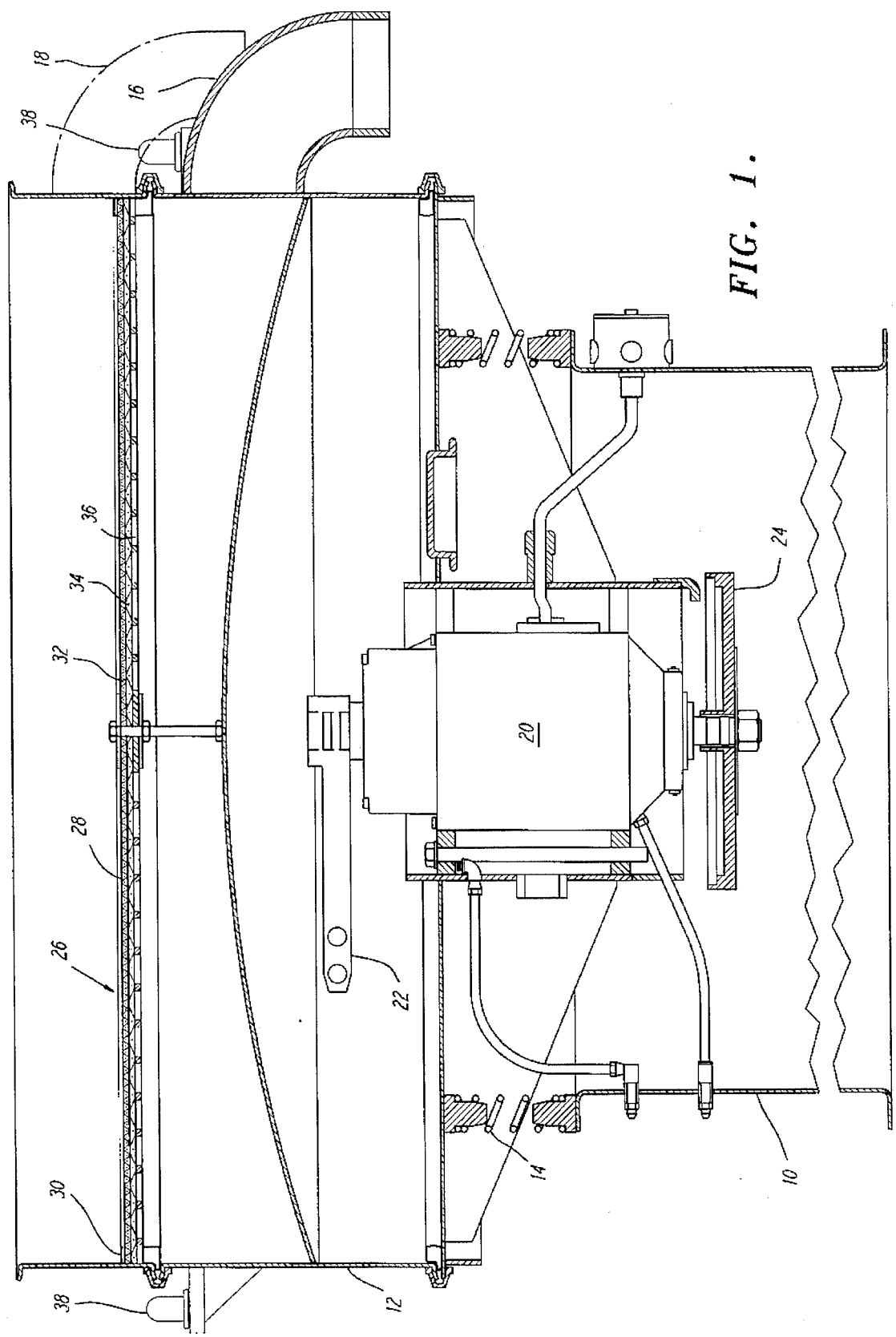
FIG. 1 is an elevation of a vibratory separator employing high frequency drives.

Turning in detail to the drawings, FIG. 1 illustrates a vibratory screen separator. The separator includes a base 10 resiliently mounting a separator frame 12 by means of springs 14. The separator frame 12 is illustrated here to be cylindrical, open at the top to receive material input and having discharge ports 16 and 18 for the screened material and the oversize material, respectively. A low frequency vibratory drive 20 is rigidly fixed to the separator frame 12. The drive 20 includes upper and lower eccentric weights 22 and 24 to generate a vibratory motion when rotatably driven.

A screen 26 extends across the separator frame 12 such that material input above the screen 26 must either pass through the screen or through the oversize discharge port 18. The screen 26 includes a screening element 28 stretched in tension uniformly by a screen frame 30. In the preferred embodiments, the screening element 28 is a composite of a fine mesh screen of a desired size with a stiffer porous sheet, most conveniently a perforated plate. Diffusion bonding is employed across the full area of the screening element 28. Such bonded screening elements are commercially available.

To properly bond fine mesh screen cloth to a perforated plate with diffusion bonding, it is preferable to include a coarse mesh screen cloth therebetween. A fine mesh screen 32, a coarse mesh screen 34 and a perforated plate 36 are shown. These are supplied as a diffusion bonded laminate which is tensioned and bonded to a screen frame 30 to form the screen structure 26. The fine mesh screen cloth may be dictated by the requirements of the materials being screened.

200 mesh and 325 mesh screen cloth is common. The backing perforated plate is preferably 80% open and is from $\frac{1}{16}$" to $\frac{3}{16}$" thick. Design choice may dictate thinner or thicker plates depending on separator size, weight of material, degree of low frequency vibrations and the like.

In vibration theory, one might attempt to analyze vibration of a thin planar object as either a membrane where the tension forces in the plane of the object dominate or as a plate where resistance to bending, or stiffness, of the planar object dominates. The propagation constant or wavenumber for membrane vibration is:

$$K_{membrane} = \frac{2\pi}{\lambda} = \frac{\omega}{C} = \omega\sqrt{\frac{\rho}{T}}$$

where
$\lambda$=wavelength
$\omega$=frequency radians per second
C=velocity of waves
$\rho$=mass density
T=static tension The wavenumber for a plate is:

$$k_{plate} = \frac{\omega}{C} = \sqrt{\omega} \left[\frac{\rho}{D}\right]^{\frac{1}{4}}$$

where
D=plate bending stiffness=

$$\frac{Eh^3}{12(1-\nu^2)}$$

E=Young's Modulus
h=thickness of the plate
$\nu$=Poisson's ratio.

To determine appropriate screen characteristics, the relative effects of stiffness and tension may be determined by calculating the ratio of the two wavenumbers:

$$\text{RATIO} = \frac{k_{membrane}}{k_{plate}} = \sqrt{\omega}\, \rho^{\frac{1}{4}} \sqrt{\frac{\sqrt{D}}{T}}$$

When this ratio is much less than unity, tension dominates and membrane theory applies. When the ratio is much greater than unity, stiffness dominates; therefore, the screen behaves in a plate-like manner. Using this formula, screens exhibiting a ratio in excess of unity tend to act plate-like while screens exhibiting a ratio of less than unity tend to act membrane like. In estimating plate bending stiffness, the standard Poisson's ratio for stainless steel may be reduced to 0.2 to account for the relief provided by the holes in the screen. Calculations of unsupported and supported screens at a vibration frequency of 20,000 Hz establish the following values:

| Screen | Mass Density $\rho$, g/m$^3$ | Plate Stiffness, D, newton-mm | Wavenumber Ratio (Eq. 4) |
|---|---|---|---|
| 200 mesh | 298 | 0.38 | 0.67 |
| 325 mesh | 209 | 0.19 | 0.51 |
| 200 mesh bonded | 696 | 13.3 | 2.02 |
| 325 mesh bonded | 611 | 11.6 | 1.88 |

In running a test unit, using an 18 inch diameter 200 mesh (74 micron) diffusion bonded screen having the properties as indicated in the table, excitation frequency was set at approximately 20,000 Hz. One hundred watts of power was employed which appears to have been more than sufficient. Increasing the wattage did not appear to significantly increase screening efficiency. Screening efficiency may in fact increase with decreased wattage and adjustment of the vibration pattern. Effective high frequency vibration is understood to be in the range of from about 10,000 Hz to 50,000 Hz. The plate-like behavior of the screen has suggested that less tension may be necessary as well.

Empirical results suggest close to double the screening efficiency of the same system without high frequency vibration. One or more high frequency generators 38 are associated with the peripheral frame. Clearly, empirical testing as to the number of generators 38, their placement and orientation for the characteristics of each material being processed is appropriately conducted. An increased number of generators 38 provides greater flexibility and uniformity of high frequency energy coverage. However, increasing the number of generators 38 increases cost and complexity. Several types of such generators are available. It is presently believed that magnetostrictive ultrasonic transducers with internal feedback control are preferred as they are more rugged for shop use and have a wider frequency band.

Figure 2:
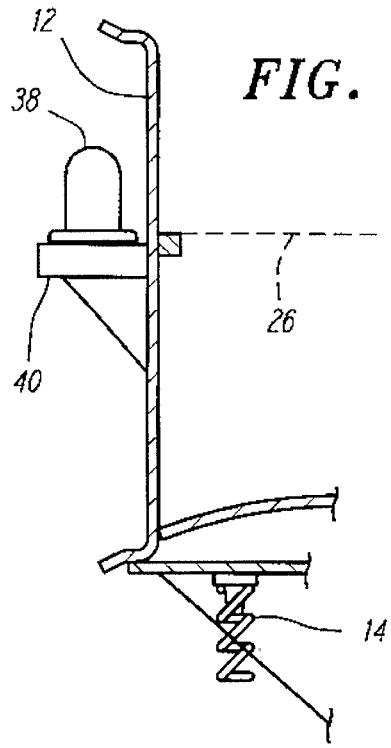
FIG. 2 is a cross-sectional detail of a separator illustrating a first mounting of a high frequency drive.
Figure 3:
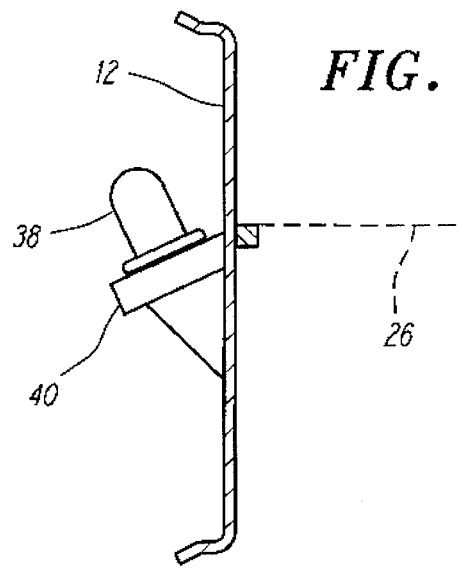
FIG. 3 is a cross-sectional detail illustrating a second mounting of a high frequency drive.

As illustrated in FIGS. 2 through 5, two types of screen mountings are employed. In FIGS. 2 and 3, the separator frame 12 directly supports the screen 26. The high frequency generator 38 is shown to be mounted rigidly to the separator frame 12 by a fixed bracket 40. The action of the high frequency generator or generators 38 through the fixed bracket or brackets 40 on the separator frame 12 is transferred from that peripheral frame to the screen 26. The separator frame 12 in its entirety is also subject to be vibrated in this arrangement.

Figure 4:
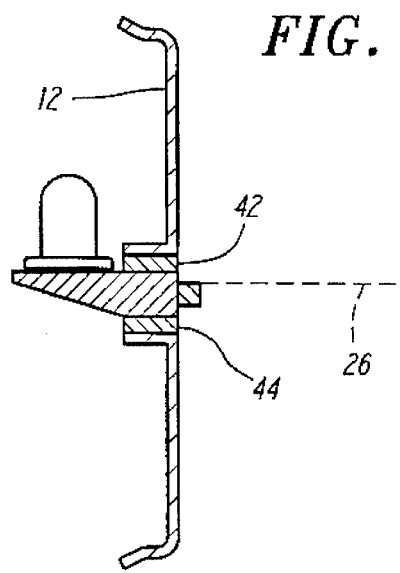
FIG. 4 is a cross-sectional detail of a second embodiment showing a first transducer mounting and an isolated frame.
Figure 5:
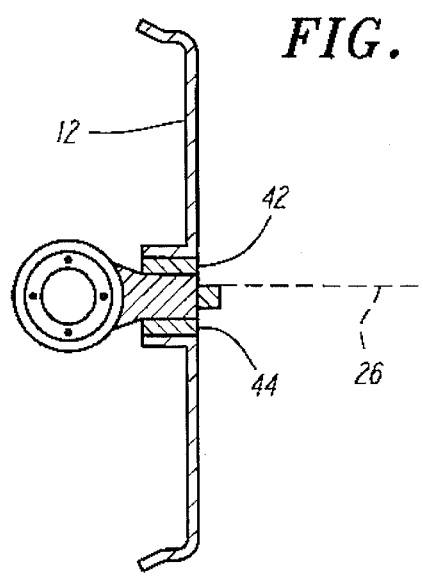
FIG. 5 is a cross-sectional detail of a second embodiment showing a second transducer mounting and an isolated frame.

An alternative arrangement is illustrated in FIGS. 4 and 5. In these figures, resilient elements or gaskets 42 and 44 are positioned on top and bottom of the screen frame 30 to isolate the screen frame from the surrounding separator frame 12. The resilient elements would act to isolate the separator frame 12 but would also act to damp some of the power generated by the generator(s) 38. Again, the vibration is introduced by means of a peripheral frame to the screen 26.

Low frequency vibration is employed at levels allowing the separator frame 12 and screen 26 to vibrate as a rigid body, even in the embodiment where the resilient elements 42 and 44 are employed. Smaller power and lighter weights may be employed for the low frequency vibratory drive as compared with conventional low frequency separators since this drive is now relegated to transportation of material across the screen. Low frequency vibrations effective for conveying material are typically considered most effective in the 3 Hz to 30 Hz range. Energy typically effective for conveyance of fine material on a screen may be measured in screen acceleration in the ½ g to 4 g range at 20 Hz.

Accordingly, an improved fine mesh screening system is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A screening system comprising
   a resiliently mounted frame;
   a low frequency vibratory drive coupled to the frame;
   a screen extending across the frame, the screen including a screen frame;

a plurality of high frequency drives mounted rigidly to the periphery of the screen, to vibrate the screen above about 10,000 Hz, the high frequency drives being rigidly mounted to the screen frame;

a resilient mounting between the screen and the screen frame; and brackets, each of the high frequency drives being rigidly fixed to one of the brackets, respectively, the brackets being rigidly fixed to the screen frame to rigidly mount the high frequency drives to the periphery of the screen.

* * * * *